Nov. 10, 1970  H. T. LEWIS, JR  3,539,328
PRODUCTION OF NITROGEN-PHOSPHORUS COMPOUNDS
Filed Sept. 17, 1968  2 Sheets-Sheet 1

FLOW SHEET FOR REACTING AMMONIA, PHOSPHORUS, AND OXYGEN (AIR)

Harry T. Lewis, Jr. INVENTOR

BY Robert A. Petrusek
Agent

APPARATUS FOR REACTING PHOSPHORUS, AMMONIA, AND OXYGEN

United States Patent Office 3,539,328
Patented Nov. 10, 1970

3,539,328
PRODUCTION OF NITROGEN-PHOSPHORUS
COMPOUNDS
Harry T. Lewis, Jr., Florence, Ala., assignor to Tennessee
Valley Authority, a corporation of the United States
Filed Sept. 17, 1968, Ser. No. 760,167
Int. Cl. C05b 7/00
U.S. Cl. 71—34                                    6 Claims

ABSTRACT OF THE DISCLOSURE

A vapor phase reaction process involving simultaneous reaction of ammonia, oxygen, and elemental phosphorus in a two-stage reactor. First stage of reactor is maintained at about 950° to 1065° F. and the second stage in the range from about 1200° to about 1600° F. Reaction gases are collected as dry, white, amorphous solid products. Solid products contain 12 to 20 percent N, 34 to 41 percent P, and up to 113 percent total plant nutrient content (N+$P_2O_5$ equivalent). Water solubility of the solid products is predetermined and is in the range from about 20 to 95 percent. The product may be further solubilized by hydrolyzing it with aqueous medium (water, water vapor, steam, and mixtures thereof) at 212°–400° F. and 0–240 p.s.i.g. for about 5–60 minutes.

---

My invention relates to new high analysis nitrogen-phosphorus compositions, more particularly to the method of their production and still more particularly to the production of new compositions of matter by the vapor phase reaction of ammonia, phosphorus, and oxygen (air) to yield dry free-flowing solid products which are highly concentrated in phosphorus (up to 41%) and in total plant nutrients (N+$P_2O_5$ equivalent up to 113%). In my invention these products may be considered as either finished fertilizer materials or, in the alternate, as intermediate products and, in the case of the latter, my invention also relates to a subsequent hydrolysis of the intermediate products to yield materials eminently suitable as fertilizers.

Heretofore the action of ammonia on phosphorus pentoxide has been studied by a number of investigators beginning, I believe, with the work of Schiff [Liebig's Ann., 103, 168 (1857)]. Sanfourche et al. [Bull. Soc. Chim., 47, No. 4, 273–9 (1930)], in a paper describing their own studies, reviewed the work of previous investigators. In the small-scale work by Sanfourche et al., red phosphorus was burned with a mixture of air and nitrogen, ammonia was added to the combustion products, and the reaction product was collected in jars. These workers investigated the effect of the amount of moisture in the combustion air and found that they obtained low yields of product when they used artificially dried air. They postulated their reaction to be $$P_2O_5 + 3NH_3 + H_2O = P_2O_3NH_2(ONH_4)_2OH$$

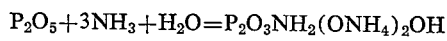
(Diammonium amidopyrophosphate)

Methods for preparing ammonium metaphosphate from phosphorus, air, water, and ammonia also have been proposed. Among the methods proposed are those described by Ross et al., U.S. Pat. 1,194,077, and by Rice, U.S. Pats. 2,561,415 and 2,689,780 and by Arvan, U.S. Pat. 2,958,577, in Rice '415, for example the reaction temperature was between 600° and 900° F. and his product contained 32 percent P, whereas in Arvan '577 the reaction temperature is in the range from 390° to 1110° F. and Arvan's products, one of which is reported to be a metaphosphate, contained above about 30 percent P.

According to these methods, phosphorus is burned with air containing moisture, and the resulting phosphorus pentoxide is reacted with ammonia. The product of this reaction is collected as a white, fluffy powder. The following reaction is presumed to take place:

$$P_2O_5 + H_2O + 2NH_3 \rightarrow 2NH_4PO_3$$

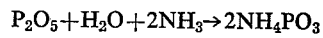

If the air used to burn the phosphorus contains insufficient water to satisfy the requirement for the reaction, additional water is added to the system.

Woodstock, in U.S. Pat. 2,122,122, describes a process in which ammonia is reacted with solid phosphorus pentoxide.

Somewhat more recently reactions involving ammonia, phosphorus, and oxygen, namely $NH_3$-$P_2O_5$ reactions, have been studied by a number of investigators. Driskell (U.S. Pat. 2,713,536) burned phosphorus in dry air and ammoniated the hot combustion gases at about 600° F. A typical product contained 33.9 percent P, was 17–78–0 grade, and was hygroscopic. Ortha C. Jones (U.S. Pat. 3,131,922) obtained materials having a maximum grade of about 19–78–0 (33.9% P) by burning phosphorus with dry air, cooling the combustion products (preferably in the range from 450° F. to about 950° F.) and then adding ammonia. In still another patent (Hibbetts and Sansing, U.S. 3,226,222) phosphorus pentoxide is suspended in a liquid hydrocarbon such as N-heptane, ammonia added in a pressure vessel at 50 p.s.i. and the temperature maintained in the range from about 120° F. to about 300° F., with the reaction product separated by filtration. By this latter method, hygroscopic products of about 27–67–0 grade (29.3% P) were obtained.

C. G. Christian (U.S. Pat. 2,884,318), unlike the prior art referred to supra, eliminated the phosphorus oxidation step prior to ammoniating the combustion gases. In that sense, his work, like that of the present invention, involves a simultaneous reaction of vapor phase mixtures of ammonia and oxygen with phosphorus. In Christian's process elemental P is contacted with gas mixtures of oxygen, ammonia, and nitrogen at reaction temperatures below about 300° F. The product is cooled and collected in a bag filter or electrostatic precipitator. He teaches that his product is substantially nonhygroscopic and substantially insoluble in water and a typical ultimate analysis thereof is a grade 19–69–0 (30.1% P). In another process by Christian (U.S. Pat. 2,839,376), phosphorus vapors are reacted with oxygen, ammonia, and nitrogen at temperatures below about 300° F., followed by passage of the reaction gases through a second reaction zone maintained above 570° F. and below 1110° F. and preferably in the range from about 800° F. to about 1100° F. In this second process of Christian, the product collected in the electrostatic precipitator is disclosed as a white, dry powder essentially nonhygroscopic and with limited solubility in water. A typical ultimate analysis thereof is a grade 21–73–0 (31.9% P). In neither of the two patents of Christian is there a disclosure of tests or the like to show the effectiveness of his materials as fertilizer. He teaches only that the material may be applied conventionally to plants in the form of an aqueous dispersion or suspension.

My invention is directed to an improvement in the method for producing nitrogen-phosphorus compositions. In essence, the novelty of my invention consists of (1) a simultaneous reaction of ammonia, phosphorus, and oxygen at temperatures higher than those used and taught by Christian with an unexpected result in solid products therefrom of both higher phosphorus and total plant nutrient ($N+P_2O_5$ equivalent) contents and (2) a method of hydrolyzing the products to yield materials eminently suitable as fertilizers. The molecular structure of my new solid products is not known. Petrographic electron microscope, and X-ray analysis indicate that some of the products are amorphous gels and others are mixtures of gels together with minor phases of monoammonium orthophosphate and unidentifiable crystal phases. Chromatographic analyses indicate that the phosphorus in my new products is present in a highly condensed form; the soluble phosphates (0.5 N NaOH) are distributed as 7 to 40 percent orthophosphate, 25 to 60 percent pyrophosphate to nonapolyphosphates, and 20 to 55 percent as polyphosphates containing more than 9 phosphorus atoms in the molecule. Infrared analysis suggests that the products are polyphosphate polymers containing some PN and PNO linkages as well as P—O—P linkages.

I have improved on the teachings of Christian in my new two-staged process wherefrom is eliminated the separate phosphorus-oxidation step prior to ammoniation as follows: In the first-stage reactor of my process the temperature is maintained between 950° F. to 1065° F. On the other hand, Christian carried out his first-stage of the reaction at much lower temperatures, i.e., at about 300° F. and preferably between about 195° F. to 285° F. In the second-stage reactor of my process the reaction temperature is maintained above about 1200° F., preferably between 1400° F. to about 1600° F. and still most preferably between about 1400° F. and 1500° F. On the other hand, Christian teaches passing the reaction gases through a second-stage reaction zone maintained at much lower temperatures, i.e., above 570° F., and in his preferred embodiment between about 800° F. and 1100° F. The solid reaction products obtained by my process contain considerably more phosphorus than those reported by Christian, i.e., about 34 percent to about 41 percent as compared to 30 percent to about 32 percent.

In my process new solid products with a wide range of water solubilities, phosphorus contents, and $N:P_2O_5$ weight ratios have been obtained. The solid products produced by my process contained from about 12 to 20 percent N, 34 to 41 percent P (78 to 94% $P_2O_5$ equivalent), 2 to 5 percent hydrogen, and 41 to 48 percent oxygen. The materials produced according to my process have a wide range of water solubility ranging from about 20 percent to about 95 percent of both N and P values at 77° F. The highest grade that I was able to obtain from practicing my process was about 20–93–0 (40.6% P and 20% water soluble). In addition the $N:P_2O_5$ weight ratios in the products from practicing my invention ranged from about 0.15 to 0.23. To put it another way the N:P atomic ratios in my products ranged from about 0.77:1 to 1.16:1.

Thus, it can be seen that the products from my process, both of low and high water solubility, each contain more phosphorus and total plant nutrient ($N+P_2O_5$ equivalent) than is disclosed in either of Christian's patents involving the reaction of $NH_3$, $P_4$, and $O_2$ or by the other investigators referred to supra. An example of products of low water solubility obtained in the practice of my invention is a 20–93–0 grade (40.6% P and 20% water soluble). I consider these products of low water solubility as intermediates in that I have found that they can be subsequently hydrolyzed to yield soluble fertilizer materials. On the other hand, the solid products of high water solubility resulting from the practice of my invention are in themselves excellent fertilizer materials. Examples of these products of high water solubility obtained from the practice of my invention are a 17–85–0 grade (37.1% P, 80% water solubility) and a 12–79–0 grade (34.5% P, 95% water solubility).

All of my products, whether they be of low solubility and therefore considered by myself to be intermediates or of high water solubility have been found to be dry, white powders with good storage properties. As a concentrated intermediate, the material from my process may be shipped economically prior to processing into a finished fertilizer.

It is therefore an object of the present invention to produce a new composition of matter by the vapor phase reaction of ammonia, phosphorus, and oxygen (air) to yield dry, free-flowing solid products which are highly concentrated in phosphorus (up to 41%) and in total plant nutrients ($N+P_2O_5$ equivalent up to 113%).

Another object of the present invention is to produce a new composition of matter by the vapor phase reaction of ammonia, phosphorus, and oxygen (air) to yield dry, free-flowing solid products which are highly concentrated in phosphorus (up to 41%) and in total plant nutrients ($N+P_2O_5$ equivalent up to 113%) wherein the phosphorus-oxidation step prior to ammoniation of the combustion gases taught in the prior art is completely eliminated.

Still another object of the present invention is to produce a new composition of matter by the vapor phase reaction of ammonia, phosphorus, and oxygen (air) to yield dry, free-flowing solid products which are highly concentrated in phosphorus (up to 41%) and in total plant nutrients ($N+P_2O_5$ equivalent up to 113%) wherein the phosphorus-oxidation step prior to ammoniation of the combustion gases taught in the prior art is completely eliminated and wherein is incorporated the simultaneous reaction of ammonia, phosphorus, and oxygen at reaction temperatures substantially higher than those shown in the prior art to yield my desired results.

A further object of the present invention is to produce a new composition of mater by the vapor phase reaction of ammonia, phosphorus, and oxygen (air) to yield dry, free-flowing solid products which are highly concentrated in phosphorus (up to 41%) and in total plant nutrients ($N+P_2O_5$ equivalent up to 113%) wherein the phosphorus-oxidation step prior to ammoniation of the combustion gases taught in the prior art is completely eliminated, wherein is incorporated the simultaneous reaction of ammonia, phosphorus, and oxygen at reaction temperatures substantially higher than those shown in the prior art to yield my desired results to thereby yield either a composition of relatively high water solubility and therefore eminently suitable for direct application to the soil as a fertilizer material or to yield a composition of matter relatively low in water solubility and to therefore yield an intermediate material of unusually high $N+P_2O_5$ values which upon subsequent hydrolysis thereof yields a fertilizer.

Still further and more general objects and advantages of the present invention will appear from the more detailed description set forth below, it being understood, however, that this more detailed description is given by way of illustration and explanation only and not by way of limitation since various changes therein may be made by those skilled in the art without departing from the spirit and scope of the present invention.

My invention together with further objects and advantages thereof will be better understood from a consideration of the following description taken in connection with the accompanying drawings in which.

Figure 1:
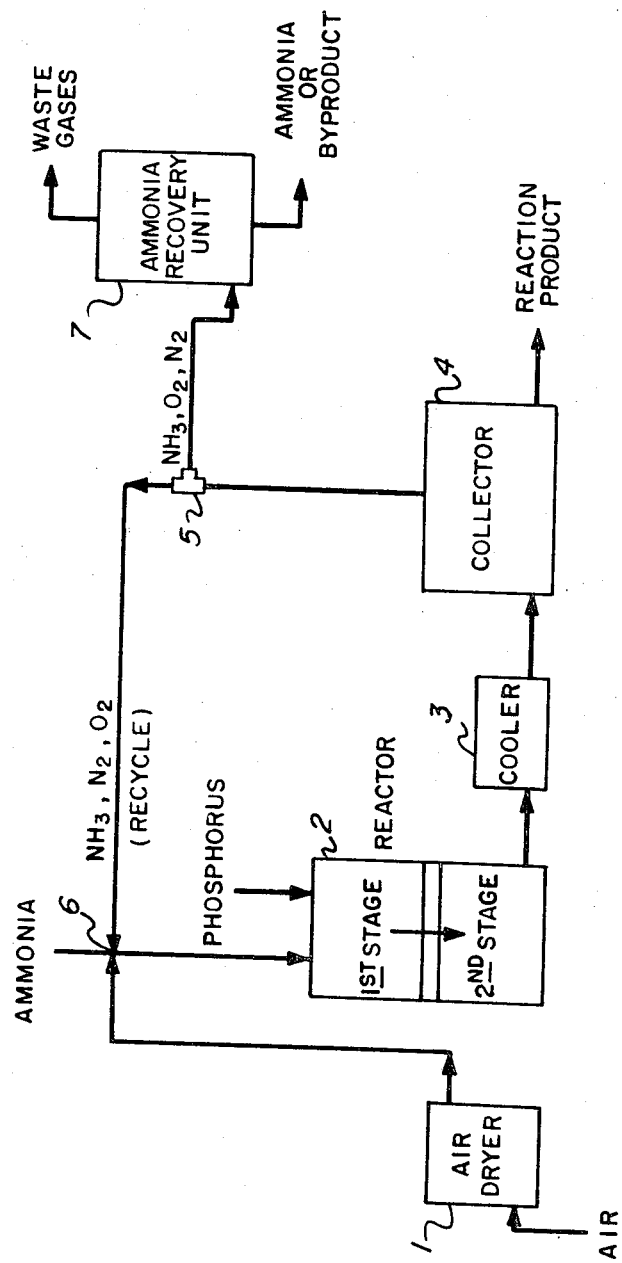
FIG. 1 is a flow-sheet illustrating the principles utilized in carrying out my invention.

Referring now more specifically to FIG. 1, air is passed through air dryer 1 to reduce the moisture content thereof in that the presence of water vapor reduces the grade of the $P_4$-$NH_3$-$O_2$ reaction products. The dried air together with ammonia and phosphorus, all being in the vapor phase, are introduced into a reactor tube. The gases pass through the first stage of the reactor tube and subsequently into the second stage thereof. The reaction is exothermic and requires little or no external heat. Depending on the production rate, cooling of reactor 2, although not shown, may be necessary. Upon leaving the second stage of reactor 2, the gases pass through cooler 3 and into collector 4 where they are removed in the form of dry, white powders. Effluent leaving collector 4 passes to point 5 where the effluent is split. The major part of the effluent is recycled to point 6. The remaining portion of the effluent is bled off to maintain a constant $N_2$:$P_4$ ratio in the feed. This portion of the effluent passes to ammonia recovery unit 7. In ammonia recovery unit 7 the ammonia may be recovered in an acid or water scrubber or by any other suitable means.

Figure 2:
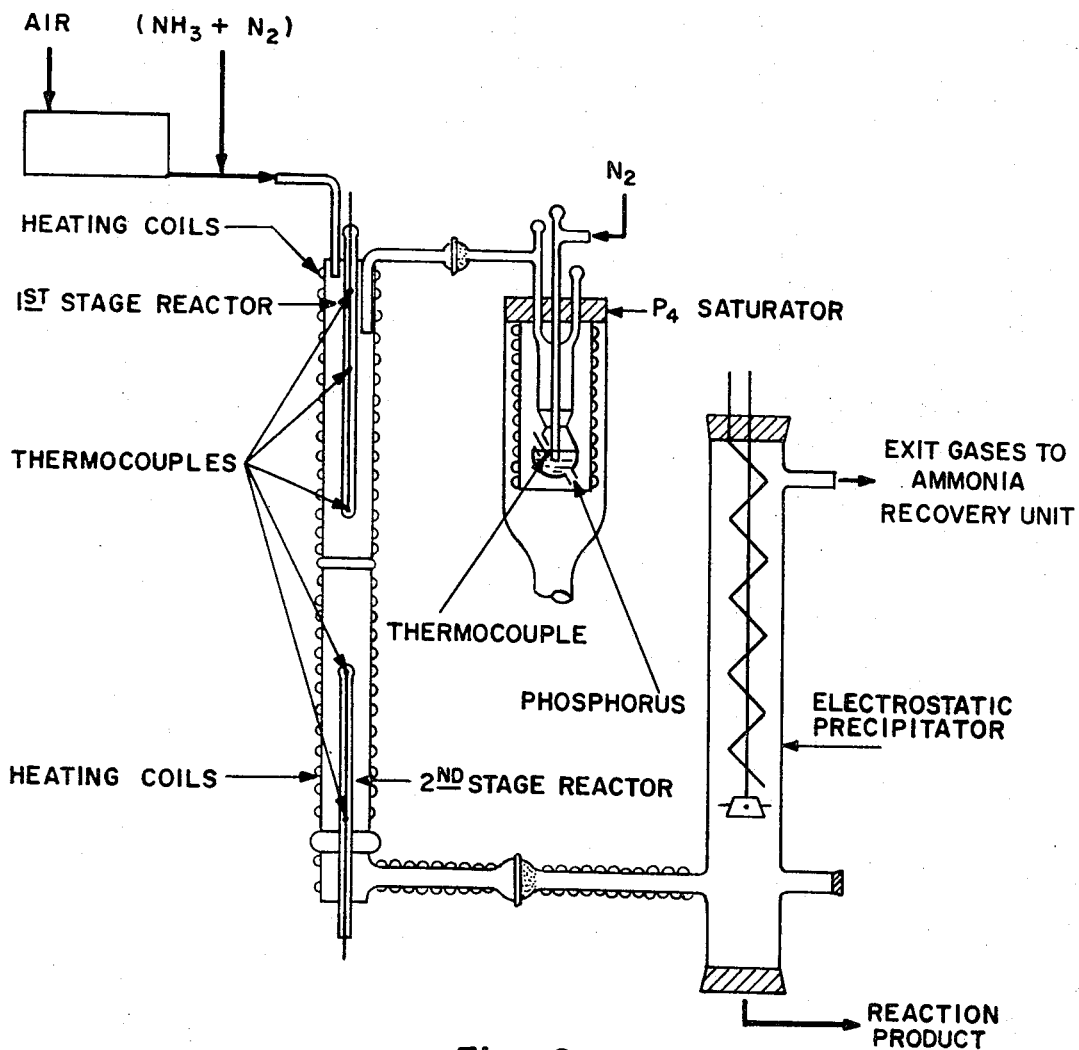
FIG. 2 is a diagram of the equipment I used on small-scale tests of my process for producing the solid products comprising my new composition of matter.

Referring now more specifically to FIG. 2, there is shown a diagram of the equipment I used on tests of the scale smaller than that of a commercial plant and of a size generally referred to as bench-scale. As may be seen the phosphorus vapor was fed by means of a saturator to a first stage reactor maintained at a temperature in the range of 950° F. to 1065° F. Simultaneously, ammonia, oxygen as dried air, and nitrogen, if desired, were metered to the first stage reactor. Upon leaving the first stage the gases passed through a second stage reactor maintained in the temperature range of 1200° F. to 1600° F. The gases subsequently leaving the second stage reactor were cooled and collected in an electrostatic precipitator as dry, white powders. Effluent from the precipitator passed through the ammonia recovery unit. The retention time of the gases in the first stage reactor maintained in the temperature range of about 950° F. to 1065° F. ranged from about 1 to about 7 seconds. Retention time in the second stage reactor varied from about 0.5 to 4 seconds. The oxygen (dried air) input ranged from about 120 to 300 percent of that required for the mole ratio $O_2$:$P_4$=5. Ammonia input ranged from about 60 to 280 percent of that required for atomic ratio N:P=2. In tests with nitrogen as a diluent the amount of nitrogen added ranged from about 30 to 68 percent of the total volume of input gases in addition to that used as a carrier for phosphorus; however, I have found that nitrogen in amounts equivalent to about 30 percent of the total volume of the input gases is preferred. Air used in the process was dried to a dew point of −80° F. (0.000005 lb. water/lb. of dry air) by passing it through an anhydrous calcium sulfate absorption system.

In order that those skilled in the art may better understand how the present invention can be practiced and more fully and definitely understood, the following examples of processes that I have used in the preparation for the production of nitrogen-phosphorus compounds prepared according to my invention are given by way of illustration and not by way of limitation.

EXAMPLE I

The tubular two-stage reactor (FIG. 2) consisted of an electrically heated tube of McDanel porcelain (1st stage, 2.0 in I.D. by about 16 in. long; 2nd stage, 1.25 in. I.D. by about 8 in. long). Phosphorus vapor (8.0 g./hr.) with nitrogen carrier gas (about 4.9 g. $N_2$/g. $P_4$) was fed from a calibrated saturator (about 322° F.) through a heated glass line to the first stage of the reactor maintained at 1065° F.

Simultaneously, a gas mixture consisting of ammonia (11.5 volume percent), dry air (53.7 volume percent), and nitrogen as a diluent (34.8 volume percent) were metered to the first stage of the reactor by means of glass, laboratory flowmeters. The feed rates of ammonia, dry air, and nitrogen as a diluent were 18, 133, and 88 g./hr., respectively. Retention time of the gases in the first stage of the reactor (1065° F.) was 2.0 seconds at operating conditions. Upon leaving the first stage the gases passed through the second stage of the reactor maintained at 1460° F. Retention time in the second stage was 0.5 second. The effective reactor volume of the first stage was 403 cubic centimeters and 130 cubic centimeters in the second stage. The total volume of gases charged through the system was 3897 cubic centimeters per minute (S.T.P.).

Oxygen (dry air) input was 300 percent of that required for a mole ratio $O_2$:$P_4$=5, and ammonia 200 percent of that required for atomic ratio N:P=2.

The gases leaving the reactor passed through a post-reaction zone (1 in. I.D. by about 7 in. long) where they were cooled to about 300° F. and then collected in an electrostatic precipitator as dry, white powders. Unreacted ammonia was caught in an acid scrubber.

The precipitator product contained 18 percent total nitrogen (6.6% ammonia nitrogen) and 40.6 percent phosphorus (93% equivalent $P_2O_5$) or 111 percent equivalent plant nutrient; about 20 percent of both the nitrogen and phosphorus were water soluble at 77° F. The N:$P_2O_5$ weight ratio in the product was 0.19.

Other tests of the process with the two-stage tubular reactor (1065° and 1460° F.) are shown in Tables I, II, and III, infra.

These data (Table I) show effect of retention time with and without nitrogen as diluent on the composition and water solubility of the product. The oxygen (dry air) input was based on 300 percent of amount required for mole ratio $O_2$:$P_4$=5, and ammonia input was 280 percent of amount required for atomic ratio N:P=2. Nitrogen added as a diluent was equal to 30 percent of input volume of gases. The feed rates of phosphorus, ammonia, dry air, and nitrogen when added as a diluent were 8, 25, 133, and 93 g./hr., respectively.

TABLE I.—REACTION OF AMMONIA, PHOSPHORUS, AND OXYGEN (AIR)
[Effect of retention time on composition and water solubility of products]

| Test No.[1] | Materials charged, g./hr. (S.T.P.) | | | | Retention time of input gases in reactor,[2] sec. | | | Product[3] | | | |
| | $P_4$ | $NH_3$ | Dry air | $N_2$ as diluent | 1st stage | 2nd stage | Total | Composition, percent | | | W.S. N or $P_2O_5$ at 77° F., percent of total |
| | | | | | | | | N | P | Grade | |
| --- | --- | --- | --- | --- | --- | --- | --- | --- | --- | --- | --- |
| 74 | 8 | 25 | 133 | 93 | 2.0 | 0.5 | 2.5 | 19.7 | 40.6 | 20-93-0 | 20 |
| 72 | 8 | 25 | 133 | 93 | 3.0 | 1.0 | 4.0 | 18.4 | 38.6 | 18-88-0 | 22 |
| 73 | 8 | 25 | 133 | 93 | 5.0 | 1.5 | 6.5 | 18.7 | 37.1 | 19-85-0 | 26 |
| 83 | 8 | 25 | 133 | 0 | 2.0 | 0.5 | 2.5 | 18.4 | 38.9 | 18-89-0 | 37 |
| 76 | 8 | 25 | 133 | 0 | 3.0 | 1.0 | 4.0 | 18.8 | 36.3 | 19-83-0 | 38 |
| 77 | 8 | 25 | 133 | 0 | 5.0 | 1.5 | 6.5 | 18.7 | 35.8 | 19-82-0 | 40 |

[1] Oxygen (dry air) input, 300% of amount required for mole ratio $O_2$-$P_4$=5. Ammonia input, 280% of amount required for atomic ratio N:P=2. Nitrogen gas used as carrier gas for phosphorus (about 4.9 g. $N_2$/g. $P_4$).
[2] First-stage temperature, 1,065° F.; second stage temperature, 1,460° F.
[3] Collected in electrostatic precipitator; dry, white powders.

TABLE II.—REACTION OF AMMONIA, PHOSPHORUS, AND OXYGEN

| Test No.[1] | Materials charged | | | | Percent of theoretical [2] | | Retention time of input gases in reactor,[3] sec. | | | Product [4] | | | W.S. N or P₂O₅ at 77° F., percent of total | Condition on removal from precipitator |
|---|---|---|---|---|---|---|---|---|---|---|---|---|---|---|
| | Grams/hr. (S.T.P.) | | | | | | | | | Composition, percent | | | | |
| | P₄ | NH₃ | Dry air | N₂ as diluent | NH₃ | O₂ | 1st stage | 2nd stage | Total | N | P | Grade | | |
| 83 | 8 | 25 | 133 | 0 | 280 | 300 | 2.0 | 0.5 | 2.5 | 18 | 38.9 | 18-89-0 | 35 | Dry. |
| 95 | 8 | 25 | 89 | 0 | 280 | 200 | 2.0 | 0.5 | 2.5 | 17 | 33.6 | 17-77-0 | 60 | Do. |
| 96 | 10 | 31 | 56 | 0 | 280 | 100 | 2.0 | 0.5 | 2.5 | | | | | Ignited. |
| 97 | 9 | 15 | 100 | 0 | 150 | 200 | 2.0 | 0.5 | 2.5 | 17 | 34.0 | 17-78-0 | 65 | Dry. |
| 50 | 8 | 10 | 133 | 0 | 110 | 300 | 3.0 | 1.0 | 4.0 | 17 | 37.1 | 17-85-0 | 80 | Do. |
| 87 | 8 | 10 | 53 | 0 | 110 | 120 | 3.0 | 1.0 | 4.0 | | | | | Wet. |
| 87-1 | 4 | 5 | 26 | 0 | 110 | 120 | 4.0 | 1.0 | 5.0 | | | | | Do. |
| 87-2 | 8 | 10 | 53 | 0 | 110 | 120 | 2.0 | 0.5 | 2.5 | | | | | Ignited. |

[1] Nitrogen gas used as carrier gas for phosphorus (about 4.5 g. N₂/g. P₄).
[2] Ammonia input based on amount required for atomic ratio N:P of 2. Oxygen (dry air) input based on amount required for mole ratio O₂:P₄ of 5.
[3] First stage temperature, 1,065° F.; second stage temperature, 1,460° F.
[4] Collected in electrostatic precipitator.

TABLE III.—REACTION OF AMMONIA, PHOSPHORUS, AND OXYGEN

| Test No.[1] | Materials charged | | | | Ammonia charged,[2] percent of theoretical | Retention time of input gases in reactor,[3] sec. | | | Product [4] | | | W.S.N or P₂O₅ at 77° F., percent of total | N=P₂O₅ wt. ratio | Ammonia recovered as product,[5] percent of charge |
|---|---|---|---|---|---|---|---|---|---|---|---|---|---|---|
| | Grams/hr. (S.T.P.) | | | | | | | | Composition, percent | | | | | |
| | P₄ | NH₃ | Dry air | N₂ as diluent | | 1st stage | 2nd stage | Total | N | P | Grade | | | |
| 74 | 6.6 | 20 | 110 | 77 | 280 | 2.0 | 0.5 | 2.5 | 20 | 40.6 | 20-93-0 | 18 | 0.22 | 19 |
| 80 | 8 | 18 | 133 | 88 | 200 | 2.0 | 0.5 | 2.5 | 18 | 40.6 | 18-93-0 | 20 | 0.19 | 25 |
| 78A | 8 | 10 | 133 | 82 | 110 | 2.0 | 0.5 | 2.5 | 18 | 38.4 | 18-88-0 | 29 | 0.20 | 47 |
| 79 | 8 | 7 | 133 | 80 | 75 | 2.0 | 0.5 | 2.5 | 15 | 36.2 | 15-83-0 | 53 | 0.18 | 61 |
| 104 | 8 | 5 | 133 | 80 | 60 | 3.0 | 1.0 | 4.0 | 17 | 34.0 | 17-78-0 | 70 | 0.22 | 92 |
| 105 | 8 | 5 | 133 | 0 | 60 | 3.0 | 1.0 | 4.0 | 12 | 34.5 | 12-79-0 | 95 | 0.15 | |
| 103 | 8 | 7 | 133 | 80 | 75 | 3.0 | 1.0 | 4.0 | 16 | 34.9 | 16-80-0 | 65 | 0.20 | 68 |

[1] Oxygen (dry air) input, 300% of amount required for mole ratio O₂/P₄ of 5. Nitrogen gas used as carrier gas for phosphorus (about 4.5 g. N₂/g. P₄).
[2] Input based on amount required for atomic ratio N:P of 2.
[3] First-stage temperature, 1,065° F.; second-stage temperature, 1,460° F.
[4] Collected in electrostatic precipitator; white, dry powders.
[5] NH₃ recovered as product = input NH₃ −(unreacted NH₃ caught in H₂SO₄ scrubber+NH₃ cracked). Ammonia cracked (2-4%) determined by passing input gases (no P₄) through reactor and calculating difference between NH₃ charged and amount found in H₂SO₄ scrubber.

EXAMPLE II (Table I)

Products of highest grade (20-93-0, 40.6% P) and lowest water solubility of both N and P at 77° F. (20%) were obtained in the two-stage tubular reactor (1065° F.—first stage and 1460° F.—second stage) with a total retention of 2.5 seconds [2.0 sec. in first stage and 0.5 sec. in second stage when nitrogen was added as a diluent (test 74)]. Increasing the total retention time to 4.0 seconds (test 72) decreased the grade to 18-88-0 (38.6% P) and increased the water solubility to 22 percent. Increasing the retention time further to 6.5 seconds (test 73) lowered the grade to 19-85-0 (37.1% P) and increased the water solubility to 26 percent. The products were dry, white powders.

EXAMPLE III (Table I)

In tests without nitrogen as a diluent, the grade of the product was lower and the water solubility higher for each retention time used as compared with tests with nitrogen added. With 2.5 seconds retention time (test 83), the grade of product was 18-89-0 (38.9% P). Increasing the retention time to 4.0 or 6.5 seconds decreased the grade to about 19-82-0 (35.8% P). The water solubilities of the products were about 40 percent. The products were dry, white powders.

These data (Table II), supra show the effect of varying the proportions of oxygen and ammonia on the composition and physical properties of the products. Tests were made in a tubular two-stage reactor (1065° F.—first stage and 1460° F.—second stage) without added nitrogen as a diluent. Length of the reaction tube or volume of the feed gases was varied to give the desired retention time. Oxygen (dry air) input was varied from 300 to 100 percent of that required for mole ratio O₂:P₄=5 and ammonia from 280 to 110 percent of the amount required for atomic ratio N:P=2.

EXAMPLE IV (Table II)

In tests with 280 percent input ammonia and 2.5 seconds total retention time, reducing the input oxygen from 300 to 200 percent reduced the grade of products from 18-89-0 (38.9% P) to 17-77-0 (33.6% P) and increased water solubility from 35 to 60 percent. Both products were white, dry powders. Further reduction of the oxygen to 100 percent caused formation of material which ignited on exposure to the atmosphere.

EXAMPLE V (Table II)

In tests with 110 percent input ammonia and 4.0 seconds total retention time, decreasing the oxygen input from 300 to 120 percent changed the product from a dry, white powder (17-85-0, 37.1% P, 80% water soluble) to a wet, sticky material. The physical properties of the products were not improved by increasing the total retention time to 5.0 seconds; decreasing it to 2.5 seconds caused the product to ignite.

These data (Table III) supra show the effect of varying the input ammonia on composition and physical properties of the products and on recovery of ammonia. Nitrogen was added as a diluent (30% of total volume of input gases) except in test 105 where it was omitted. Length of the reaction tube or volume of the feed gases was varied to give the desired retention time. In all tests, the oxygen (dry air) input was based on 300 percent of that required for mole ratio O₂:P₄=5 because this proportion previously resulted in good products. The ammonia input was varied from 280 to 60 percent of the amount required for atomic ratio N:P=2. Unreacted ammonia was recovered by scrubbing the off-gas with sulfuric acid. Ammonia cracking was determined in tests in which input gases free of phosphorus were passed through the reactor and difference between ammonia charged and amount in the scrubber was calculated. Ammonia cracked in the tests ranged from 2-4 percent.

EXAMPLE VI
(Table III)

With 2.5 seconds total retention time (2.0 sec. in the first stage and 0.5 sec. in second stage) and nitrogen added as a diluent, decreasing the input ammonia from 280 to 75 percent of theoretical caused decreases in grade from 20–93–0 (40.6% P) to 15–83–0 (36.2% P), increases in water solubility from 18 to 53 percent, and increases in ammonia recovered as product from about 20 to 60 percent. The products were dry, white powders.

EXAMPLE VII
(Table III)

With 75 percent ammonia and with nitrogen added as a diluent, increasing the total retention time from 2.5 to 4.0 seconds lowered the grade from 15–83–0 (36.2% P) to 16–80–0 (34.9% P), increased the water solubility from 53 to 65 percent, but increased ammonia recovered in the product from about 60 to 70 percent. The product was a dry, white powder.

EXAMPLE VIII
(Table III)

With 60 percent ammonia, nitrogen added as a diluent, and 4.0 seconds total retention time, input ammonia recovered as product was 92 percent. The product was 17–78–0 grade (34.0% P), 70 percent water soluble, and was a dry, white powder; weight ratio $N:P_2O_5$ was 0.22.

EXAMPLE IX
(Table III)

With 60 percent ammonia, nitrogen omitted as diluent, and 4.0 seconds total retention time, a substantially water soluble material (95% of both N and P at 77° F.) was obtained. The product was 12–79–0 grade (34.5% P), and was a dry, white powder; weight ratio $N:P_2O_5$ was 0.15.

Greenhouse tests

Greenhouse tests were made of solid products from the reaction of ammonia, phosphorus, and oxygen (air). The products ranged from 21–83–0 to 19–91–0 grade and were about 20 to 60 percent water soluble at 77° F. Results of the short-term tests (2–4 months) indicated that only part of the materials were as effective as N from A/N and P from CSP. The portion of each material available for plant growth was that which was initially water soluble plus that which was hydrolyzed to a water-soluble form.

Solutions were made for short-term (6 wk.) tests. They were made under conditions designed to retard hydrolysis and preserve in solution a large portion of the long chain polyphosphate content of the materials by either extracting the water soluble faction thereof at room temperature or by heating a water-product mixture (weight ratio of water to product=1) under reflux conditions at atmospheric pressure and approximately 212° F. for one hour.

The phosphate in the solutions was distributed as 7 to 36 percent orthophosphate, 4 to 6 percent pyrophosphate, 2 to 29 percent tripolyphosphates, and 31 to 85 percent as polyphosphates containing more than 3 phosphorus atoms in the molecule.

Results of the greenhouse tests indicated that the solutions were effective sources of N and P. After 6 weeks, dry matter yields (corn) and phosphorus uptakes indicated that the solutions were as good or better than CSP as sources of phosphorus.

Hydrolysis work

Since the greenhouse tests indicated that the portion of the products available for plant growth was that which was water soluble, tests were made to study conditions necessary for dissolving the products. The tests were made on products of low water solubility (20%). These products may be considered as intermediates because of their high concentration of plant food and excellent storage properties. The intermediate products dissolve in an aqueous medium such as water, but the rate of hydrolysis is slow at ambient temperature. One method of rapidly dissolving the materials is to treat them with steam under pressure. The procedure is illustrated in Example X infra.

EXAMPLE X

Test conditions for preparation of the solid reaction product (18–93–0, 20% water soluble at 77° F.) made in the two-stage tubular reactor (1065° and 1460° F.) and in short retention time (2.5 sec.; 2.0 sec. in first stage and 0.5 sec. in second stage) are described in Example I.

Two and one-half grams of the solid product and 2.5 grams of water (wt. ratio 1:1) were placed in a Pyrex liner (10-ml. capacity) and then charged to a stainless steel pressure reactor of about 125-ml. capacity (Table IV, test 15). Water was then added to the reactor (outside the liner) to furnish steam pressure at test temperature. Air was not excluded from the reactor. The mixture was heated at 394° F. and 240 p.s.i.g. for 1 hour. At the end of the test, the reactor was cooled to ambient temperature and opened. The hydrolysis product contained solution and salted-out material, and was about 9–46–0 grade. The hydrolysis product was then warmed (about 175° F.) to facilitate dissolution of the salts and then small amounts of water were added as the material was cooled to retain the salts in solution at ambient temperature.

Solubility of the product was complete in 1 hour at 394° F. and 240 p.s.i.g. Chromatographic analysis indicated 99 percent of the phosphate was converted to orthophosphate in the test. The solution obtained at 77° F. was 5–21–0 grade and had a pH of 4.4. The N:P atomic ratio (1.21) indicated that the solution was a mixture of monoammonium orthophosphate and diammonium orthophosphate.

Other data are shown in Table IV below.

TABLE IV.—HYDROLYSIS TESTS OF PRODUCT[1] FROM REACTION OF AMMONIA, PHOSPHORUS, AND OXYGEN (AIR)

| Test No.[2] | Reaction temp., °F. | Pressure,[3] p.s.i.g. (approx.) | Percent of N or $P_2O_5$ charged as product | Grade at 77° F. | N:P atomic ratio | Hydrolyzate solution | | | | |
|---|---|---|---|---|---|---|---|---|---|---|
| | | | | | | pH | Ortho | Pyro | Tripoly | >Tripoly |
| 13[4] | [5]215 | 0 | 66 | 7–31–0 | 1.15 | 4.6 | 46 | 9 | 9 | 36 |
| 14[6] | 350 | 142 | 90 | 5–22–0 | 1.15 | 4.6 | 99 | 1 | 0 | 0 |
| 15[6] | [5]394 | 240 | 100 | 5–21–0 | 1.21 | 4.4 | 99 | 1 | 0 | 0 |

[1] Material (18–93–0 grade, 40.6% P; 20% of both N and P water soluble at 77° F.) made in two-stage tubular reactor (1,065° and 1,460° F.) with total retention time of 2.5 seconds at operating conditions. Feed rates of phosphorus, ammonia, dry air, and nitrogen as diluent were 8, 18, 133, and 88 g./hr., respectively.
[2] Time at test temperature, 1 hr. Other tests conducted for periods of 5 minutes up to 1 hr.
[3] Includes pressure due to air in reactor.
[4] Water-product mixture (wt. ratio water:product=1) heated at atmospheric pressure under reflux conditions.
[5] Range of about 212° F. to about 400° F.
[6] Water-product mixture (wt. ratio water:product=1) placed in Pyrex liner (10-ml. capacity) and charged to stainless steel reactor of about 125-ml. capacity. Water was added to reactor (outside the liner) to furnish steam pressure at test temperature. At end of test, reactor cooled to ambient temperature.

While I have shown and described particular embodiments of my invention, modifications and variations thereof will occur to those skilled in the art. I wish it to be understood, therefore, that the appended claims are intended to cover such modifications and variations that are in the true scope and spirit of my invention.

What I claim as new and desire to secure by Letters Patent of the United States is:

1. A vapor phase reaction process involving ammonia, oxygen, and elemental phosphorus for the production of unusually high analysis nitrogen-phosphorus compositions eminently suitable for use as fertilizer material comprising the steps of:
   (1) simultaneously introducing vapors of ammonia, oxygen, and elemental phosphorus into a first reaction zone;
   (2) maintaining in said first reaction zone a temperature in the range of about 950° F. to about 1065° F.;
   (3) controlling and proportioning the introduction of said vapors of ammonia, oxygen, and elemental phosphorus into said first reaction zone to maintain therein (a) an excess of oxygen in the range from greater than about 120 percent up to about 300 percent (all percents by weight) of that required to yield a $O_2:P_4$ mole ratio of 5 and (b) a quantity of ammonia in the range from about 60 percent to about 280 percent of that required to yield a N:P atomic ratio of 2;
   (4) maintaining the residence time of said vapors of ammonia, oxygen and elemental phosphorus in said first reaction zone in the range from about 1 second to about 7 seconds;
   (5) withdrawing the resulting reaction gases from said first reaction zone and introducing said withdrawn reaction gases into a second reaction zone;
   (6) maintaining the temperature of the resulting reaction gases introduced into said second reaction zone in the range from about 1200° F. to about 1600° F.;
   (7) maintaining the residence time of the resulting reaction gases introduced into said second reaction zone in the range from about 0.5 second to about 4 seconds; and
   (8) withdrawing the resulting reaction gases from said second reaction zone and collecting said gases withdrawn from said second reaction zone as a substantially nonhygroscopic, amorphous, white, particulate solid nitrogen-phosphorus product having a predetermined solubility in water and containing a N:P atomic ratio in the range from about 0.77 to about 1.16.

2. The process of claim 1 wherein the temperature in said second reaction zone is maintained in the range from about 1400° F. to about 1600° F.

3. The process of claim 1 wherein the temperature in said second reaction zone is maintained in the range from about 1400° F. to about 1500° F.

4. The process of claim 1 wherein the predetermined solubility in water of the withdrawn product is in the range from about 20 percent to about 95 percent.

5. The process of claim 4 wherein the product therefrom is further solubilized by subsequently hydrolyzing said product with aqueous medium, said aqueous medium selected from the group consisting of water, water vapor, steam, and mixtures thereof, and said hydrolyzing of said product conducted under the following conditions:

Hydrolysis of reaction product with aqueous medium:
   Temperature range _____ ° F__ 212–400
   Pressure range _____p.s.i.g__ 0–240
   Retention time _____min__ 5–60

6. The process of claim 4 wherein the product therefrom contains from about 12 percent to about 20 percent by weight nitrogen, expressed as N, and from about 34 percent to about 41 percent by weight of phosphorus, expressed as P, said process characterized by the fact that the grade of said product is dependent and inversely proportional to the water solubility thereof, and further characterized by the fact that the grade of said product is increased as (a) the relative proportion of ammonia input is increased, (b) the relative proportion of the oxygen input is increased, (c) the retention time is decreased, and (d) the amount of nitrogen gas used as a diluent is increased.

References Cited
UNITED STATES PATENTS 2,839,370   6/1958   Chrishan _____ 7—32

SAMIH N. ZAHARNA, Primary Examiner

R. BARNES, Assistant Examiner

U.S. Cl. X.R.

23—106; 71—49